United States Patent [19]

Jetzer et al.

[11] Patent Number: 5,318,425
[45] Date of Patent: Jun. 7, 1994

[54] DISPLACEMENT MACHINE ACCORDING TO THE SPIRAL PRINCIPLE

[75] Inventors: Gregor Jetzer, Nussbaumen; Roland Kolb, Regensdorf; Fritz Spinnler, Mellingen, all of Switzerland

[73] Assignee: Aginfor AG für Industrielle Forschung, Wettingen, Switzerland

[21] Appl. No.: 991,579

[22] Filed: Dec. 16, 1992

[30] Foreign Application Priority Data

Dec. 16, 1991 [CH] Switzerland .......... 3714/91

[51] Int. Cl.⁵ .................................. F01C 1/02
[52] U.S. Cl. ......................... 418/55.6; 418/91
[58] Field of Search .............. 418/55.5, 55.6, 73, 418/91

[56] References Cited

U.S. PATENT DOCUMENTS 5,024,589 6/1991 Jetzer et al. .......... 418/556

FOREIGN PATENT DOCUMENTS 3928870 3/1990 Fed. Rep. of Germany ..... 418/55.6
0020689 1/1987 Japan ................. 418/55.6

Primary Examiner—Richard A. Bertsch
Assistant Examiner—Charles C. Freay
Attorney, Agent, or Firm—Oblon, Spivak, McClelland, Maier & Neustadt

[57] ABSTRACT

A displacement machine for compressible mediums exhibits several spiral-shaped convoying spaces (11a, 11b), which are disposed in a stationary housing (7a, 7b). A displacement body (1-4) is assigned to the conveying spaces and is held in such a manner on a disk-shaped rotor (1) that can be driven eccentrically relative to the housing that during service each of its points effects a circular movement defined by the circumferential walls of the conveying spaces. To this end an eccentric disk (23), on which the rotor (1) is mounted by means of an oil-lubricated mounting, is disposed on the drive shaft (24). A sliding bearing (22) is provided on the rotating eccentric disk (23) for the orbiting rotor (1). The oil is fed in and drawn off by way of a borehole (31) in the eccentric disk. Passages are disposed within the eccentric disk to feed oil without air into the sliding bearing gap.

12 Claims, 4 Drawing Sheets

DISPLACEMENT MACHINE ACCORDING TO THE SPIRAL PRINCIPLE

BACKGROUND OF THE INVENTION

1. Field of the Invention

The invention relates to a displacement machine for compressible mediums with several spiral-shaped conveying spaces, which are disposed in a stationary housing, and to a displacement body which is assigned to the conveying spaces and which is driven eccentrically relative to the housing so that during service each of its points effects a circular movement defined by the circumferential walls of the displacement chamber. An eccentric disk, on which the rotor is mounted by means of an oil-lubricated mounting, is disposed on the drive shaft.

2. State of the Art

Displacement machines of the spiral design are known, for example, from the DE-C-26 03 462. A compressor built according to this principle provides an almost pulsation-free conveying of the gaseous working medium which consists of, for example, air or at mixture of air and fuel. It could, therefore, also be used advantageously for the purpose of charging internal combustion engines. When such a compressor is operating, several crescent-shaped working spaces, which move from the inlet through the displacement chamber to the outlet, are enveloped along the displacement chamber between the spiral-shaped displacement body and the two circumferential walls of the displacement chamber, resulting in their volumes continuously decreasing and the pressure of the working medium being correspondingly increased.

A machine of the aforementioned kind is known from EP 0 354 342. In this machine and, moreover, in all known spiral compressors, in which for the translatory guide of the rotor a guide shaft that runs conformally with the drive shaft is provided, the drive shaft is mounted in roller bearings. This is especially obvious in the displacement machine according to the EP 0 354 342, in which the drive shaft is mounted in two ball bearings and the eccentric collar disposed on the drive shaft is mounted by way of a needle bearing.

The kind of bracing or mounting of the rotor is relatively expensive, since for space reasons a needle bearing without the inner race is used. This requires, however, that the rollway on the eccentric collar must be hardened, a feature that in turn limits the choice of an optimal method for producing the eccentric shaft. An optimal process is the casting process in which spherulitic graphite cast iron is used. Spherulitic graphite cast iron can be hardened; in the meantime the strength that is necessary for a highly stressed roller bearing operation is not obtained in the race, as is the case, for example, with roller bearing steel.

As a consequence of the high stress due to the centrifugal force and the eccentric movement of the permanent grease lubrication of the roller bearing, these known, highly stressed needle bearings are lubricated with oil, the oil being supplied to the bearing by way of a borehole system in the drive shaft.

SUMMARY OF THE INVENTION

Starting from the knowledge that as a consequence of the high thermal and mechanical stresses in the main eccentric bearing one cannot make do without its continuous lubrication with a liquid lubricant, it is an object of the invention to simplify the bearing concept of the displacement machine with respect to cost optimization.

The above object is satisfied by providing a sliding bearing on the rotating eccentric disk for the orbiting rotor, whereby the oil is fed in and drained by way of a borehole in the eccentric disk, and by disposing within the eccentric disk means to feed oil without air into the sliding bearing gap.

Apart from rendering the machine less expensive due to the fact that, in addition to the replacement of a roller bearing with a sliding bearing, its smaller radial dimensions also lead to an increase in the free space available for the air flow, a special advantage lies in the fact that with this measure a hardened surface on the eccentric disk can be dispensed with. The indirect admission of oil to the lubricating gap by way of degassing means allows air-free oil to be made available in a simple manner for the highly stressed eccentric bearing.

It is expedient if a cavity that is open in the direction of the lubricating gap is arranged in the eccentric disk, and in particular in the angular plane in which the eccentric disk is the furthest away from the axis of rotation. The oil is preferably conveyed into the cavity by way of a borehole in the eccentric disk, whose opening is arranged radially outside the axis of rotation of the drive shaft. The oil and, if desired, the air are led out together by way of an elongated borehole which branches off from the cavity and lies in the axis of rotation of the drive shaft. With this measure the oil flowing into the cavity is thrown into the lubricating gap as a consequence of the action of centrifugal force, whereas the air that is present in the oil is separated from the centrifugally thrown oil and is expelled subject to the action of this centrifuge, and flows out of the cavity by way of the elongated borehole. Additionally, the cavity in the eccentric disk causes the rotating mass to decrease. The drive shaft becomes lighter in total and less centrifugal force has to be compensated for, a feature that permits lighter balance masses.

If the region of the radial plane of the lubricating gap has a channel which extends, starting from the cavity and in the circumferential direction of the lubricating gap, and in particular counter to the direction of rotation of the drive shaft, then a simple means is provided to lead the air-free lubricating oil on the most direct path to the highest stressed point of the eccentric bearing.

To eventually drain air penetrating through the highly stressed sealing rings of the shaft on both sides of the sliding bearing, it is suitable to arrange on the circumference of the eccentric disk a clear space, which extends between the sealing rings of the shaft and connects the oil spaces on both sides of the sealing rings of the shaft to the cavity. This clear space preferably has a crescent shape, where the center line of the crescent is, like that of the cavity, in the angular plane in which the eccentric disk has its greatest distance relative to the axis of rotation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

For the purpose of explaining the method by which the compressor functions, which is not the subject matter of the invention, reference is made to DE-C3-2 603 462 that has already been cited. In the following only the construction of the machine and process that are necessary for understanding are described briefly.

Figure 1:
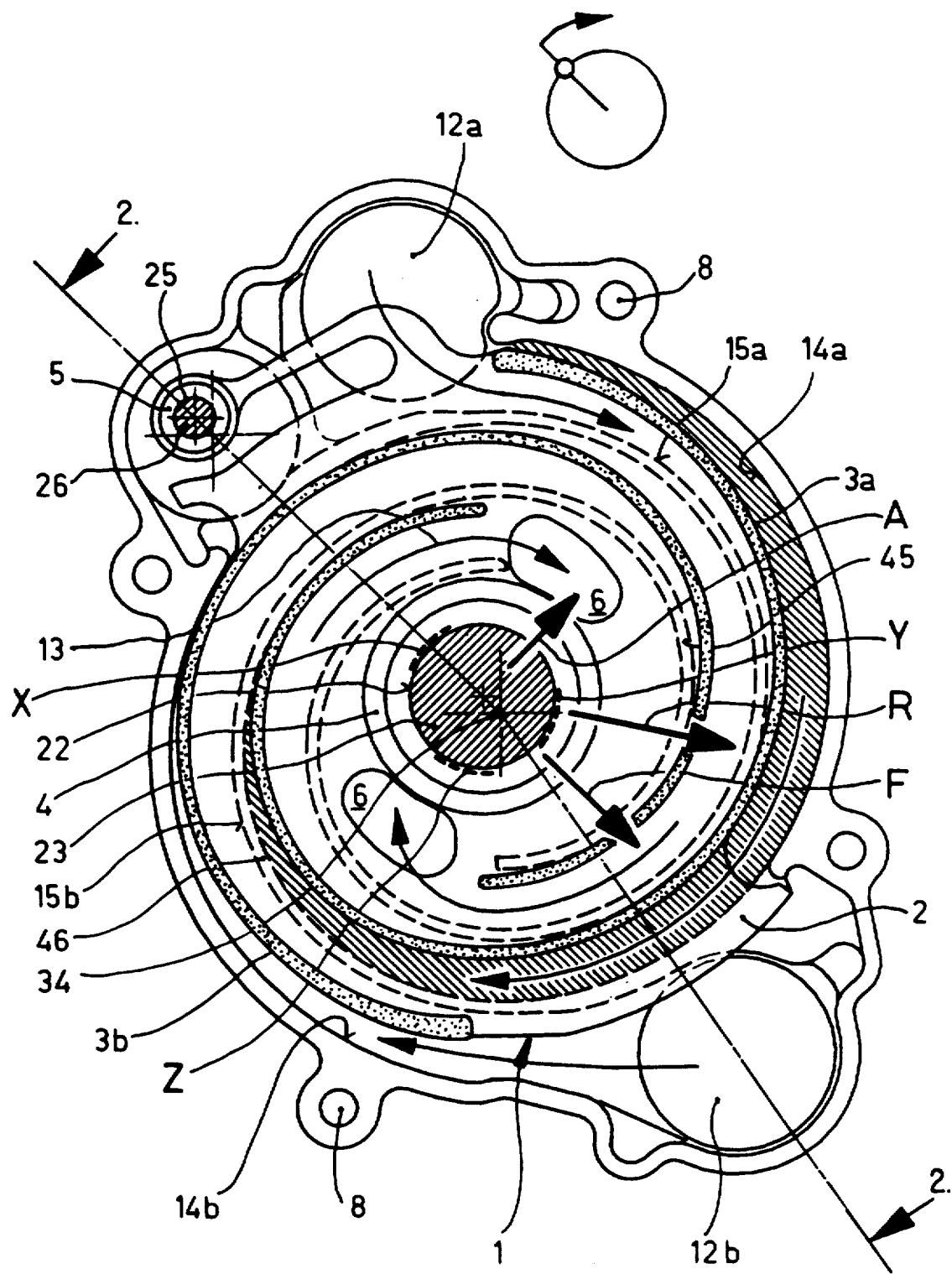
FIG. 1 is a cross sectional view of the drive-sided housing section of the displacement machine along line I—I in FIG. 2.

FIG. 1 shows the housing with the conveying spaces and the inserted displacement body. The entire rotor of the machine is denoted as 1. Two spiral-shaped strips 3a, 3b are offset by 180° and are attached to both sides of the disk 2. The strips 3a, 3b, are held perpendicularly on the disk 2. In the example shown, the spirals themselves comprise several adjoining circular arcs. A hub 4 mounts the disk 2 on an eccentric disk 23 via the sliding bearing 22. This eccentric disk is in turn a part of the drive shaft 24.

An eye 5, which is arranged radially outside the strips 3a, 3b, is intended to receive a guide bearing 25 which is slipped on an eccentric bolt 26. It in turn is a part of a guide shaft 27. The spiral end has four passage windows 6, 6' in the disk so that the medium can flow from one side of the disk to the other, for example, in order to be drawn off in a central outlet arranged only on one side.

Figure 2:
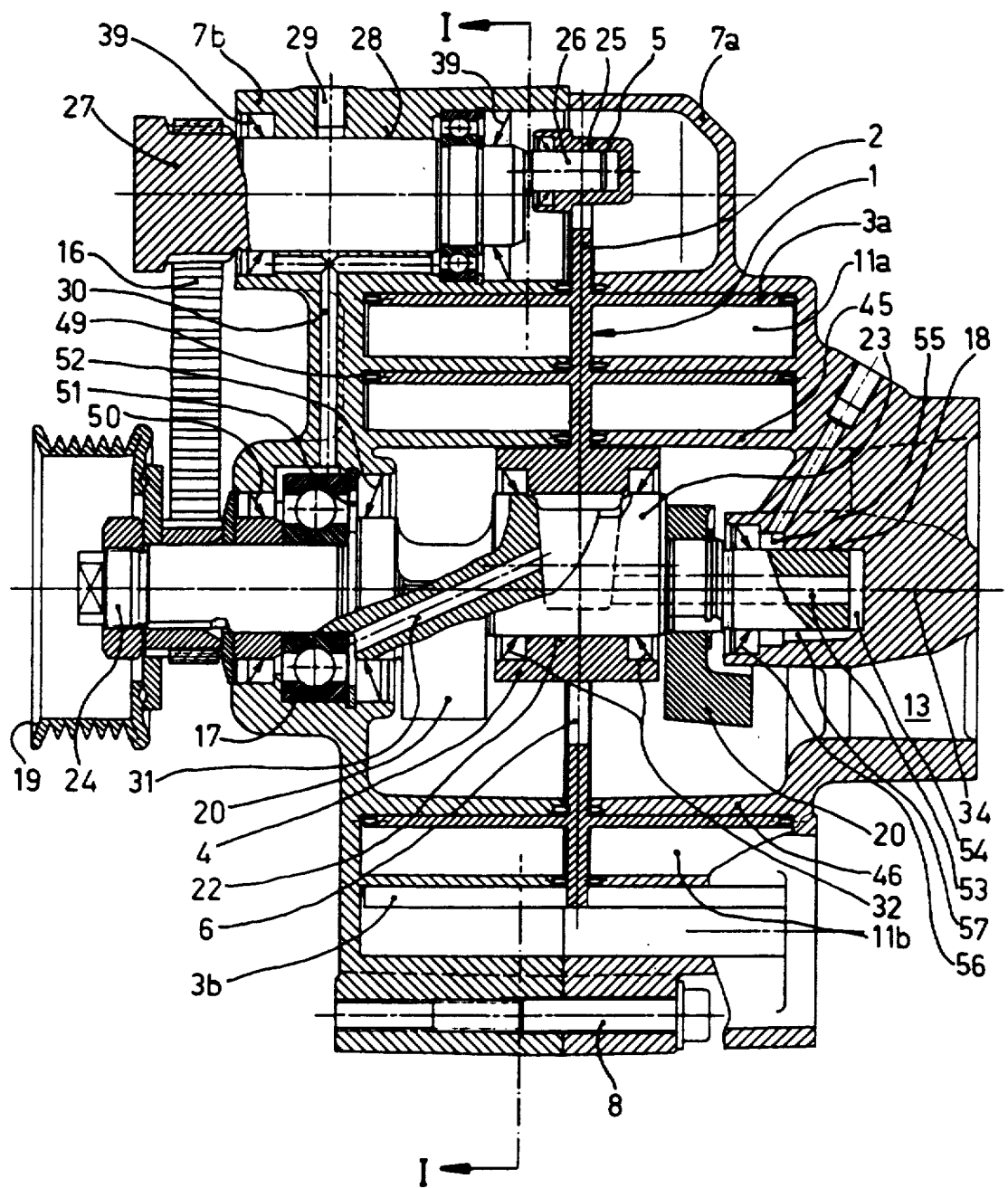
FIG. 2 is a longitudinal view of the displacement machine along line II—II in FIG. 1.

FIG. 1 shows that half 7a of the machine housing that is shown on the left in FIG. 2. The housing comprises two halves 7a, 7b, connected together by way of fastening eyes 8 to accommodate threaded joints. Two conveying spaces 11a and 11b are offset by 180° and are machined like a spiral-shaped slot into the two halves of the housing. They extend from one inlet each 12a, 12b, which is arranged on the outer circumference of the spiral in the housing to an outlet 13 (FIG. 2) which is provided within the housing and is common to both conveying spaces. They exhibit essentially parallel cylindrical walls 14a, 14b, 15a, 15b, which are spaced equidistant apart and, like the displacement bodies of the disk 2, enclose a spiral of approximately 360°. Between these cylindrical walls extend the displacement bodies 3a, 3b, whose curvature is dimensioned in such a manner that the strips almost touch the inner and outer cylindrical walls of the housing at several points, for example at two points simultaneously. Seals 49 in suitable grooves are embedded on the free faces of the strips 3a, 3b and the cross pieces 45, 46. With said seals, the working spaces are sealed relative to the side walls of the housing or the displacement body.

The drive and guiding of the rotor 1 are provided for by the two spaced eccentric arrangements 23, 24, and 26, 27 respectively. The drive shaft 24 is mounted on the drive side in a roller bearing 17 and on the air discharge side in a sliding bearing, 18. On its end projecting beyond the housing half 7b, the shaft is provided with a V-belt pulley 19 for the drive. Counterweights 20 are attached to the drive shaft 24 in order to compensate for the inertia force produced during the eccentric drive of the rotor. The guide shaft 27 is held within the housing half 7a by a sliding bearing 28 which is sealed on both sides with annular seals 39. In order to obtain a definite guide of the rotor at the dead point positions, the two eccentric arrangements are synchronized conformally by way of a toothed belt drive 16. This double eccentric drive provides that all of the points of the rotor disk, and thus also all of the points of both strips 3a and 3b, effect a circular displacement movement. As a consequence of the strips 3a, 3b approaching repeatedly and alternatingly the inner and outer cylindrical walls of the related conveying chambers, there arise crescent-shaped working spaces which enclose the working medium and which are displaced during the drive of the rotor disk through the conveying chambers in the direction of the outlet, on both sides. In this manner the volumes of these working spaces are decreased and the pressure of the working medium is correspondingly increased.

The bearing, housed in the housing 7a, 7b, and the main eccentric bearing 22, are lubricated by a common lubrication system. A lubricant, preferably oil, is conveyed from a lubricant source (not illustrated) by way of a borehole 29 in the housing half 7b to the sliding bearing 28. The oil is collected on both sides of this bearing and is led by way of a borehole 30 into the region of the drive shaft 24 between the roller bearing 17 and the related drive-sided shaft sealing ring 50. From there the oil penetrates and lubricates the roller bearing 17 and flows into an annulus 51, which is sealed on the side by means of an additional shaft sealing ring 52.

Figure 5:
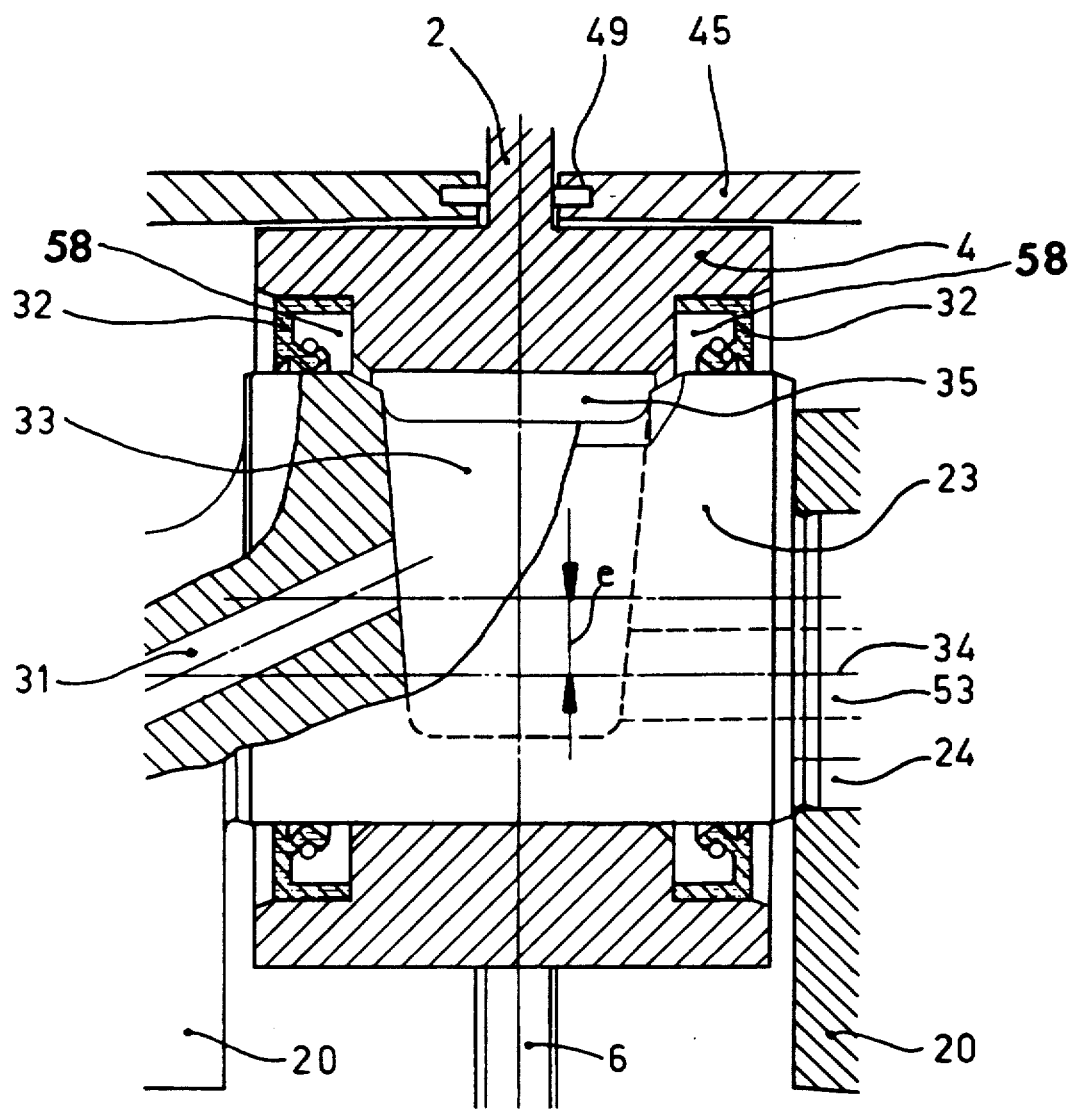
FIG. 5 is a partial cross sectional view of the eccentric mounting.

At this stage the eccentric bearing 22 is fed from this annulus 51. This bearing is designed as a simple sliding bearing and is sealed by way of the shaft sealing rings 32 relative to the interior of the machine, as apparent from FIG. 5.

A direct supply of oil delivered by way of radial bores in the eccentric disk to both sides of the bearing, as known, for example, from the aforenoted EP 0 354 342, would be disadvantageous in the present case. First, the air that is already contained in the oil would impair its lubricating power; secondly, additional air can flow into the bearing space by way of the shaft sealing rings that are provided on both sides of the bearing. This is because the interior of the machine, in which the eccentric drive is located, is under overpressure on the other side of the sealing rings of the shaft during service.

As apparent from FIGS. 2 to 5, the lubricant is fed correspondingly into the lubricating gap in the bearing center. This takes place by way of a straight oblique bore 31 in the eccentric disk. The oblique bore communicates on the drive side with the annulus 51 and opens within the disk into a cavity 33. The cavity is open in the direction of the lubricating gap. The opening of the cavity extends over a circumferential region X (FIG. 1) and is situated in an angular plane in which the eccentric disk exhibits its greatest radial offset. The opening of the oblique bore 31 is arranged in a radial position which is outside the axis of rotation 34 of the drive shaft. Owing to the rotation, the oil flowing into the cavity is thrown outwardly into the circumferential region X as a consequence of the centrifugal force. Insofar as there is air in the oil, the air is separated from the oil due to the centrifugal action. This air flows radially inwardly into the center of rotation of the cavity, which coincides with the axis of rotation 34 of the drive shaft. The air and the oil that is not required for lubrication are then drawn off from the cavity 33 by way of an elongated bore 53, centered in the drive shaft.

Figures 3, 4:
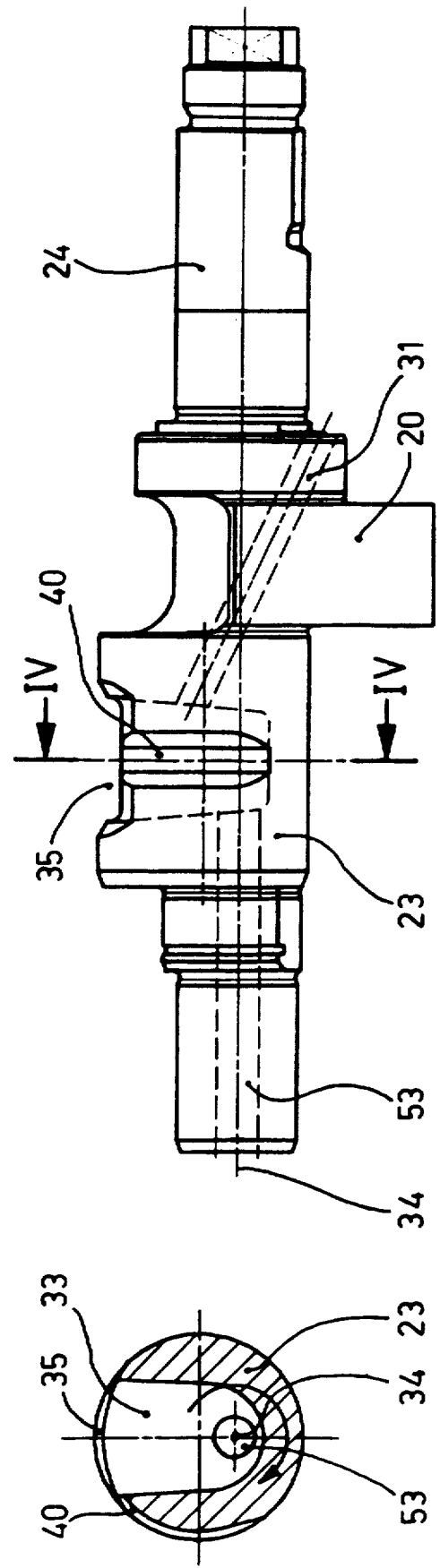
FIG. 3 shows a drive shaft without fittings.
FIG. 4 is a cross sectional view of the drive shaft along line IV—IV in FIG. 3.

Now, of course, precautions must be taken against the air entering on the side through the shaft sealing rings 32. To this end, the eccentric disk 23 is perforated in the region of the shaft sealing rings in order to form a crescent space 35 (FIG. 4).

This space is located in the same angular plane as the circumferential region X and extends axially between the two shaft sealing rings 32. In so doing, it connects the oil spaces 58 arranged on both sides of the shaft sealing rings to the cavity 33. This space 35 is made by the simple method of grinding the eccentric disk, with the axis of rotation as the center and with the radius of the eccentric disk. As evident from FIG. 5, the air which penetrates the highly stressed shaft sealing rings 32 orbiting with eccentricity, flows directly out of the oil spaces 58 into this space 35, while circumventing the lubricating gap, and then flows along the wall of the cavity 33 radially inwardly into its center of rotation.

Thus, the circumferential region X exhibits virtually air-free oil which is admitted into the lubricating gap of the sliding bearing. What is important at this stage is to lead the oil to those bearing points that are stressed the most.

In FIG. 1 the reaction force of the eccentric disk is denoted as F, said force being generated by the centrifugal force. The reaction force caused by the drive of the rotor is denoted as A. The resulting reaction force is shown with the arrow R. This resultant causes the highest stress in the sliding bearing gap in region Y. For a given eccentric disk, this region Y is always at the same place. Displacements to the top or to the bottom can occur due to a varying drive power or stress due to centrifugal force.

When the oil is guided freely in the eccentric disk, the oil has the tendency, induced by centrifugal force, to be thrown into the region X. This is independent of the new cavity arrangement. Since, during eccentric mounting, the lubricant flows in the lubricating gap counter to the direction of rotation, there could be the risk that, owing to the long distance that is covered, the oil does not adequately supply the region Y. Tests have shown, however, that the highly stressed region Y is adequately supplied with oil when the oil is fed into the region denoted as Z in FIG. 1. Based on the center of rotation and seen in the direction of rotation, this region Z lies about 90° in front of the highly stressed region Y.

To ensure this oil supply, the outer circumference of the eccentric disk has a circumferential depression which forms a channel 40 connecting the cavity 33 and the region Z. As obvious from FIG. 4, this channel runs counter to the direction of rotation of the drive shaft. The air-free oil, fed freshly into the circumferential region Z in such a manner from the circumferential region X, retains its supporting and lubricating powers without additional effort as far as into the endangered circumferential region Y. To be able to show the channel 40 better, in FIG. 3 the drive shaft 24 is rotated by 180°, as compared to the drawing in FIG. 2; i.e., the drive side is located in the right part of the figure. The compensating weight 20 shaded in FIG. 2 is also not on the shaft shown in the preassembled state in FIG. 3.

The oil flowing out of the elongated bore 53 on the air-side of the drive shaft still has the task of lubricating the less stressed air-sided shaft bearing 18. This bearing is designed as a sliding bearing and is provided on both sides with oil spaces 54, 55 which are sealed toward the outside. In addition, the drive-side oil space 55 is defined by a shaft sealing ring 56 acting against the drive shaft. The opposite oil space 54, into which the elongated bore 53 opens, is sealed by the wall of the housing section 7a. The two oil spaces 54, 55 are connected together by way of a channel 57. In addition, this channel is designed as a depression in the bearing 18. Over its entire length the channel is open in the direction of the drive shaft 24, thus uniformly feeding the bearing 18.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A displacement machine comprising:
   a stationary housing;
   a displacement body in said stationary housing and comprising a disk and spiral strips extending perpendicularly from both sides of said disk, said displacement body cooperating with said stationary housing to form conveying spaces for a gas to be displaced;
   eccentric means in said housing for causing rotary movement of said displacement body such that the conveying spaces move from an inlet to an outlet of a gas to be displaced, said eccentric means including a rotary drive shaft having an eccentric disk on which the displacement body is mounted via a bearing surface; and
   means for lubricating said bearing surface, including a first borehole in the eccentric disk, and means for feeding oil without air into a lubrication gap for the bearing surface,
   wherein said means for feeding oil without air comprise:
   a cavity in said eccentric disk and open toward the lubricating gap at an angular position wherein the eccentricity of the disk is at a maximum, said cavity being in fluid communication with said first borehole, whereby said cavity is fed with oil, and whereby air is separated from the oil in the cavity by centrifugal force; and
   a second borehole extending along the axis of rotation of the drive shaft and communicating with the cavity for discharging air from the cavity.

2. The displacement machine of claim 1 wherein an opening of said first borehole into said cavity is offset from the axis of rotation of the drive shaft.

3. The displacement machine of claim 1 wherein said eccentric disk has seal rings at axially opposite ends thereof, and a crescent shaped, axially extending clear space connecting oil spaces at said seal rings with said cavity.

4. The displacement machine of claim 3 wherein a center of the clear space is positioned at the angular position where the eccentricity of the eccentric disk is at a maximum.

5. The displacement machine of claim 1 including a circumferentially extending channel in the eccentric disk, the channel facing the lubricating gap and extending from the cavity in a direction counter to a direction of rotation of the drive shaft.

6. The displacement machine of claim 1 including at least one additional sliding bearing communicating with said second borehole.

7. A displacement machine comprising:
- a stationary housing;
- a displacement body in said stationary housing and comprising a disk and spiral strips extending perpendicularly from both sides of said disk, said displacement body cooperating with said stationary housing to form conveying spaces for a gas to be displaced;
- eccentric means in said housing for causing rotary movement of said displacement body such that the conveying spaces move from an inlet to an outlet of a gas to be displaced, said eccentric means including a rotary drive shaft having an eccentric disk on which the displacement body is mounted via an oil lubricated sliding sleeve bearing surface;
- a borehole in the rotary drive shaft for feeding oil to said sleeve bearing; and
- means in said eccentric disc for separating air from the oil fed from said borehole.

8. The displacement machine of claim 7, wherein said separating means comprise:
- a cavity in said eccentric disk and open toward a lubrication gap for the bearing surface at an angular position where the eccentricity of the eccentric disk is at a maximum, said cavity being in fluid communication with a first portion of the borehole, whereby said cavity is fed with oil, and whereby air is separated from the oil in the cavity by centrifugal force; and
- a second portion of the borehole extending along the axis of rotation of the drive shaft and communicating with the cavity for discharging air from the cavity.

9. The displacement machine of claim 8 wherein an opening of said first portion of the borehole into said cavity is offset from the axis of rotation of the drive shaft.

10. The displacement machine of claim 8, wherein said eccentric disk has seal rings at axially opposite ends thereof, and a crescent shaped, axially extending clear space connecting oil spaces at said seal rings with said cavity.

11. The displacement machine of claim 10, wherein a center of the clear space is positioned at the angular position where the eccentricity of the eccentric disk is at a maximum.

12. The displacement machine of claim 8, including a circumferentially extending channel in the eccentric disk, the channel facing the lubricating gap and extending from the cavity in a direction counter to a direction of rotation of the drive shaft.

* * * * *